Figure 1:
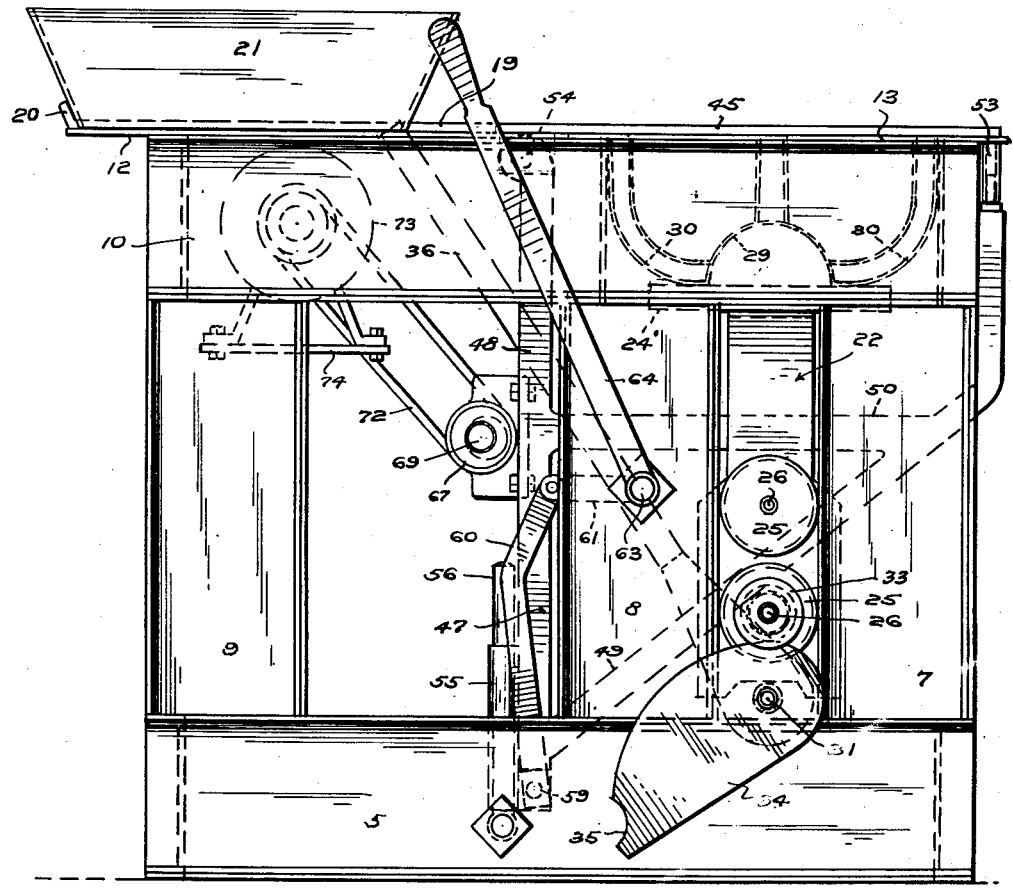

Sept. 2, 1952

J. H. MINTON 2,608,739

MACHINE FOR MOLDING DRAIN TILE

Filed Sept. 6, 1951

3 Sheets-Sheet 1

INVENTOR.
JOHN H. MINTON,
BY
ATTORNEY.

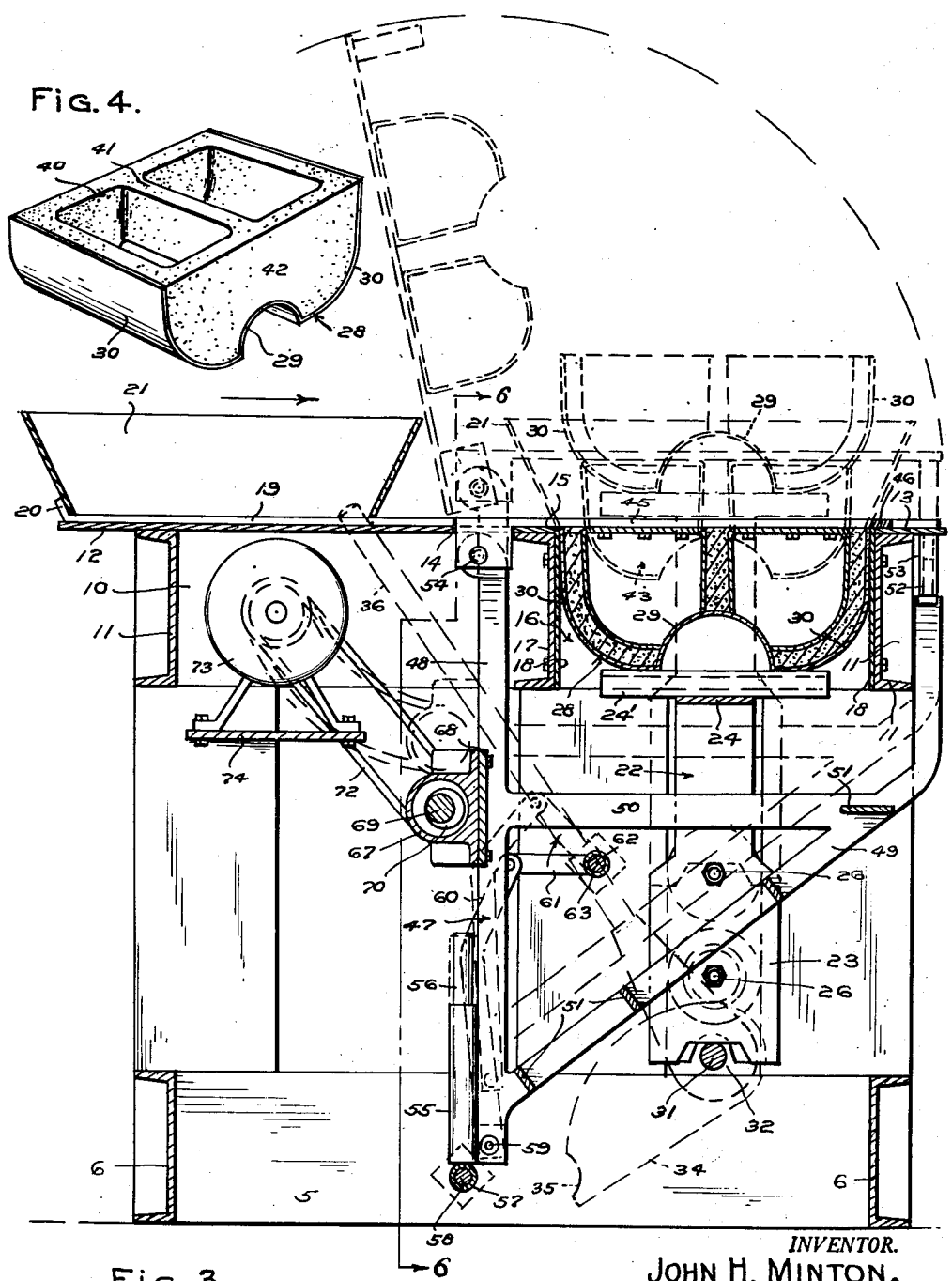

Sept. 2, 1952 J. H. MINTON 2,608,739
MACHINE FOR MOLDING DRAIN TILE
Filed Sept. 6, 1951 3 Sheets-Sheet 3

INVENTOR.
JOHN H. MINTON,
BY
ATTORNEY.

Patented Sept. 2, 1952

2,608,739

UNITED STATES PATENT OFFICE 2,608,739

MACHINE FOR MOLDING DRAIN TILE

John H. Minton, Opa-Locka, Fla.

Application September 6, 1951, Serial No. 245,307

9 Claims. (Cl. 25—41)

This invention relates to improvements in machines for casting or molding cement blocks, tile or the like and contemplates such a machine equipped with a mold box in which is shiftably positioned a contoured pallet for the molding support of the cement product and a core device that is positioned upon the machine to swingably project into the box in suitable spaced relation to the pallet and vertically shiftable and swingable from the cement product after molding and means for bodily shifting the pallet and its supported molded product in a vertical plane from the machine for manual removal.

The invention contemplates new and novel means for the support of the pallet that is bodily elevated by a pair of cam devices to be locked in the elevated position during the removal of the molded product and its supporting pallet.

An important object of the invention resides in a new and novel core support that is carried by a frame member in such manner, that the frame member is bodily shifted in a vertical plane to withdraw the core from the molded product, with the core device supported upon the frame in a manner that permits of swinging movement away from the mold box prior to the elevation of the pallet and molded product.

A further object of the invention resides in vibrator means supported upon the core supporting frame member and novel means for controlling the vertical shifting movement of the core frame and other novel mechanical details which will be more clearly described in detail.

Other objects and advantages of the invention will be readily apparent during the course of the following description, reference being had to the accompanying drawings, wherein has been illustrated a preferred example thereof and wherein like characters of reference are employed to denote like parts throughout the several figures.

Figure 2:
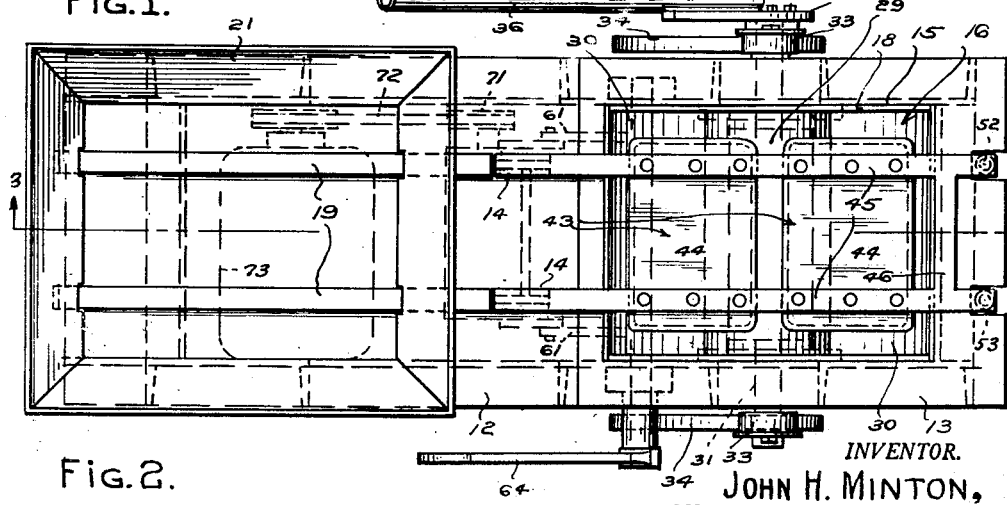
Figures 5, 6:
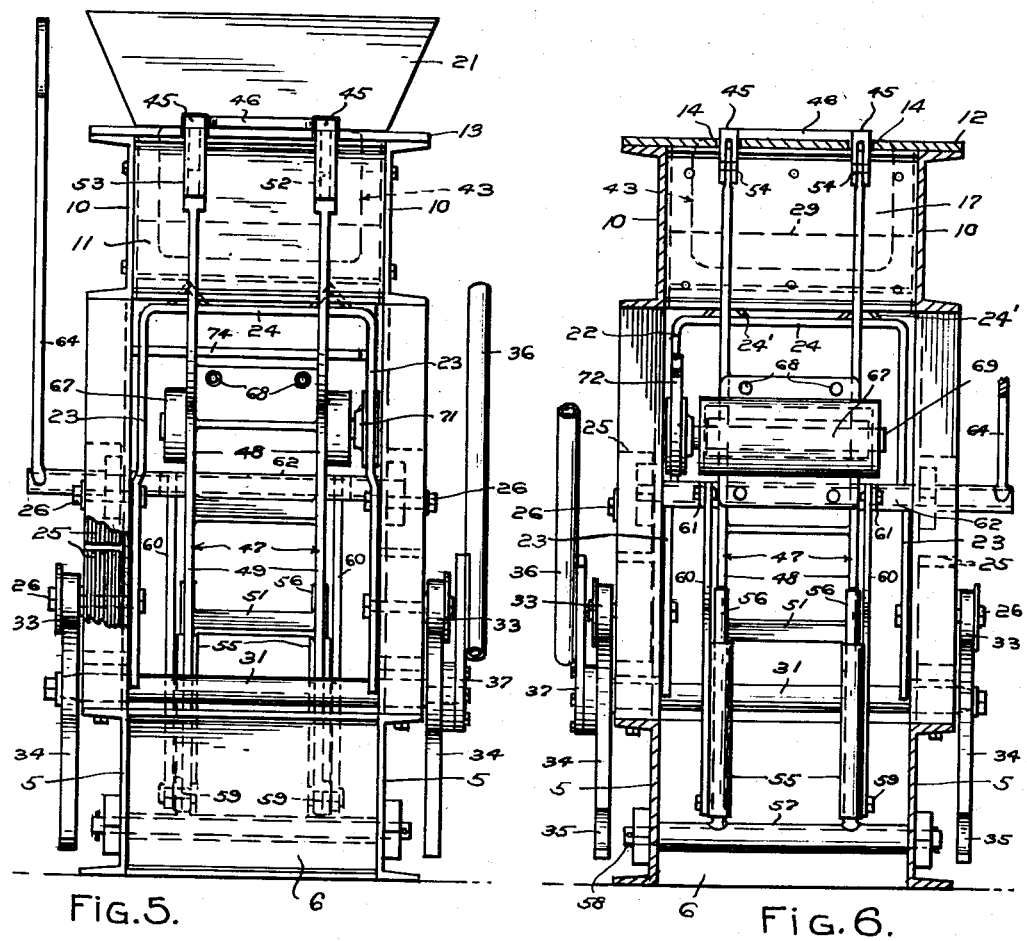
Figures 7, 8:
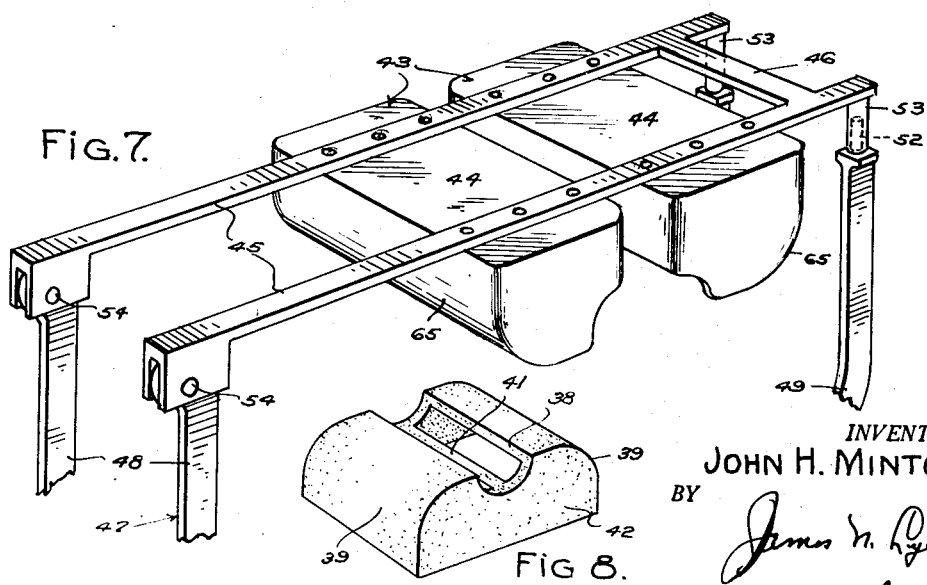

In the drawings:

Figure 1 is a side elevation of a machine constructed in accordance with the invention, Figure 2 is a top plan view thereof, Figure 3 is a central vertical longitudinal section of the device, taken on line 3—3 of Figure 2, Figure 4 is a perspective view of a molded article supported upon a pallet, Figure 5 is an end view of the machine, Figure 6 is a transverse vertical sectional view of the machine, taken on line 6—6 of Figure 3, Figure 7 is a fragmentary perspective view of a core supporting device, and Figure 8 is a perspective view of a molded product in the inverted position as used.

Referring specifically to the drawings, the machine embodies a rigid base structure consisting of parallel and spaced apart channel members 5, tied together at their ends, by cross channels 6, welded or otherwise secured thereto. Vertical channels 7, 8 and 9, are welded to the channels 5 and support at their upper ends, parallel and horizontally arranged channels 10. The channels 10 are parallel with the channels 5 and identically spaced apart. The channels 10 are tied together at their ends by cross channels 11, preferably welded thereto. The vertical channels 7 and 8 are spaced apart to form a roller trackway for rollers, to be later described. The base structure just described has a height that is convenient for an operator to actuate the several mechanical elements to be described.

Rigidly secured to the upper edges of the channels 10 and 11, are top plates 12 and 13, forming a work table. The plates are co-extensive in width with the outer sides of the channels 10, as shown and each plate 12 and 13 extends somewhat beyond the channels 11, as clearly shown in Figure 3. The plate 12 is provided with a pair of identical spaced apart rectangular openings 14, for a purpose to be described. The plate 13 is provided with a rectangular opening 15, defining a mold box, generally denoted by the reference character 16. The longitudinal edges of the opening 15 are flush with the inner sides of the channels 10, while one transverse edge of the opening 15 is flush with the inner side of one channel 11, while the opposite transverse edge of the opening 15 is flush with the inner side of a cross channel 17, welded or otherwise fixed to the channels 10. Thus, the channels 11 and 17 and the inner walls of the channels 10 define a mold box open at top and bottom. Metallic liners 18 are bolted to the four inner walls of the box 16. Spaced apart trackways 19 are bolted to the plate 12 and terminate at the openings 14. The outer ends of the tracks 19 are upturned at 20 to form a stop for a slidable hopper 21. The hopper is provided with flaring side walls and end walls and the end walls at their bottom are notched to engage the trackways and permit the lower marginal edges of the hopper walls to slidably engage the plates 12 and 13 when shifted to a position of registry with the opening 15, indicated by dotted lines in Figure 3.

A pallet support, indicated as a whole by the numeral 22, embodies parallel flat sides 23 and a cross head 24. The sides 23 slidably engage the inner sides of the channels 7 and 8 and the support as a whole is vertically shiftable and accurately guided in its vertical movement, by pairs of rollers 25, rotatable on stub shafts 26, carried by the sides 23. The rollers 25 have a diameter to traverse the trackways 27, formed by the spacing of the channels 7 and 8. The cylindrical surfaces of the rollers 25 are grooved to prevent the accumulation of foreign matter thereon that might interfere with the proper operation thereof. The pallet support 22 is centrally positioned with respect to the mold box 16. The head 24 is provided with a pair of spaced apart angle irons 24', welded thereto and providing a resting support for a pallet, indicated as a whole by the numeral 28. The pallet is preferably formed of sheet metal shaped to provide a transversely extending semi-cylindrical shell 29 and outwardly and upwardly curved ends 30. The pallet is identical in width throughout and such width is just sufficient to permit of its being lowered into the box 16. The ends 30 terminate adjacent the upper ends of the box 16 when the pallet is properly positioned for molding. The closure sides for the pallet are obviously formed by the side liners of the box.

The pallet support 22 is limited in its downward movement by the abutment of the lower ends of the sides 23 upon a cross shaft 31, journalled in bearings 32, fixed to the upper flanges of the channels 5 intermediate the channels 7 and 8. Each of the shafts 26 of the lowermost rollers 25 are extended outwardly and rotatably support flanged rollers 33, preferably provided with anti-friction bearings upon their respective shafts 26. The shaft 31 is extended beyond the sides of the base frame and carry cam elements 34, splined or otherwise rigidly held upon the shaft 31 against turning with respect thereto. The cams 34 are in alignment with the rollers 33 and bear against the rollers when the shaft 31 is rotated to elevate the pallet support 22. The cams at their outer ends are further notched on substantially the same arc as the diameter of the rollers 33, as shown at 35 and serve to lock the cams in their uppermost position against accidental shifting to thereby maintain the pallet support, pallet and the molded article in a position above the surface of the machine during such time as the pallet is being removed and a new one being installed. The cams are actuated by a hand lever 36, bolted to a flange plate 37, carried at one outer end of the shaft 31. As clearly shown in Figure 6, the upper portion of the pallet support 22 is reduced slightly in width to provide adequate clearance for the support to pass upwardly through the mold box when the pallet is to be ejected. The uppermost position of the pallet support is clearly indicated in dotted lines in Figure 3.

For purpose of clarifying the operation of this machine, it might be well to first briefly describe the article to be molded therein. The tile or block, shown in Figure 4 in the inverted position of molding and in Figure 8 in the position of use, is of hollow construction and is adapted to be used primarily as a field drain for sewage disposal. As in Figure 8, the block or tile is provided with a transversely extending semi-cylindrical channel 38, open upon both ends. The opposite ends of the tile are rounded, as at 39, in accordance with the contour of the pallet 28. As more clearly shown in Figure 4, the bottom of the tile is formed open, at 40 and a transverse partition 41 spans the block or tile to provide adequate strength and to partially support the ends of the conventional cylindrical drain tile that is positioned in the semi-cylindrical channel 38, in use. The tile, as shown, has side walls 42.

Since the tile, as shown is of hollow construction, it becomes apparent that suitable cores must be employed in conjunction with the pallet form. As more clearly shown in Figures 3 and 7, core members 43, of sheet metal are identical in size and shape and have flat tops 44, bolted to a pair of spaced apart flat bars 45, having a cross piece 46. The bars 45 are identical in width and thickness to the tracks 19 and normally are in alignment therewith. The bars 45 normally engage the upper surface of the plates 12 and 13 and maintain the cores 43 at an elevation with their flat tops flush with the surface of the plates 12 and 13 when in the position of molding. The bars 45 are connected with and vertically shiftable by a frame, designated as a whole, by the numeral 47. The frame consists of a pair of spaced apart, generally Y-shaped members, including rear perpendicular legs 48 and preferably integral upwardly inclined legs 49, all suitably braced both horizontally and transversely by bars 50 and 51. The terminal ends of the legs 49 are perpendicular and parallel with the legs 48 and at their upper ends, are provided with pins 52, over which engage tubular sleeves 53, carried by the outer ends of the bars 45. The opposite ends of the bars 45 are hinged to the upper ends of the legs 48, as at 54. The hinge connections 54 are shiftable vertically through the slots 14 of the top plate 12. Each of the legs 48, at their lower ends, are provided with tubular sleeves 55, preferably welded thereto and these sleeves 55 are vertically shiftable upon rods 56, fixed with respect to a tubular shaft 57, rockable upon a fixed solid shaft 58 that is transversely and horizontally supported in the channels 5. Pivotally connected, as at 59, to the lower end of each leg 48, are links 60, pivotally connected at their upper ends, to crank arms 61. The arms 61 are carried by a tubular sleeve 62, splined upon a rockshaft 63. The shaft 63 is journalled in the vertical channels 8, with one end extending therebeyond and has rigidly connected thereto, a hand lever 64. Movement of the lever 64 toward the front or right hand side of the machine, causes the crank arms 61 to lift the frame 47 vertically upon the rods 56, which movement causes the bars 45 and their supported cores 43 to lift bodily from the molded article, as shown clearly by dotted lines in Figure 3. This construction is essential in order to remove the cores without damaging the molded article. After the cores have been shifted vertically, the bars 45 and the cores 43 are swung through an arc, indicated in dotted lines in Figure 3 and rest against the end of the hopper 21. The swinging of the bars 45 upward disengages the sleeves 53 from the pins 52.

Each core 43, as before stated, are formed of suitable sheet metal having the flat tops 44. The cores are spaced apart a distance equal to the thickness of the partition 41 of the blocks or tile, and with their inner parallel walls tapered to permit the disengagement of the cores from the molded article. The opposite sides of the cores are rounded to conform to the curvature of the pallets, as shown at 65 and with the terminal edges of the cores contacting the semi-cylindrical portion of the pallet when in a position of molding, shown in full line section in Figure 3. The cores are obviously proportioned both transversely and longitudinally to provide a suitable thickness to the several walls of the article as shown in Figure 8. The corners of the cores are also rounded to facilitate removal after molding.

Since molded articles of the character formed by this machine must be rapidly and continuously formed, it becomes necessary that a semi-dry mixture of cement and sand be employed and vibrated into a dense mass within the mold. A vibrator, shown more clearly in Figure 3, consists of a housing 67, bolted to the frame legs 48, at 68 and has journalled therein a concentric shaft 69, having an eccentric 70 formed thereon. The shaft 69 is extended at one end of the housing 67 and carries a grooved pulley 71. The pulley 71 is engaged by a flexible belt 72, driven from a corresponding pulley carried upon the shaft of an electric motor 73. The motor 73 is supported upon a plate 74, welded or otherwise connected with the vertical channels 9. Any other form of vibrator may be employed and the operation of the vibrator is interrupted when the frame 47 is elevated, since the operating belt 72 is relieved of tension as the frame 47 moves upward. The interruption of the vibration is necessary as the cores are being elevated in order to avoid damage to the walls of the molded article. The degree of vibration may be controlled by the interchanging of the drive pulleys.

The operation of the machine is as follows:

Assuming that the parts are in the position shown in full lines in Figures 1, 2, 3, 5 and 6, with the hopper in the extreme left hand position, a suitable mixture of sand and cement in semi-dry state is loaded into the hopper. The operator then shifts the hopper longitudinally of the machine until it is stopped against the cross bar 46, in which position the open bottom of the hopper is in direct registry with the mold box. The vibrator is then placed in operation and the cement and sand mixture settles downwardly into the mold formed by the pallet 28 and the cores 43. After a predetermined period of vibration, the hopper is then shifted back to its original position, its bottom edges scraping off excess mix. The operator then swings the lever 64 forwardly, and through the crank arm 61 and links 60, elevate the frame 47 to the dotted line position shown in Figure 3. The bars 45 and the supported cores 43 are then swung in an arc upon the hinges 54 until they rest against the edge of the hopper, also shown in dotted lines. The frame 47 will be held in the elevated position due to the fact that the hinge elements 54 are now resting upon the forward terminal ends of the tracks 19. The operator then swings the lever 36 forwardly and, through the medium of the cams 34, the pallet support 22 is elevated, forcing the pallet and the molded block upward in a vertical plane to the dotted lines position of Figure 3. An attendant then lifts the pallet and its supported block from the angle irons 24' for transfer to a place of curing. A new pallet is then placed upon the angle irons 24' and the lever 36 swung in the reverse direction, lowering the pallet support and causing the pallet to be positioned in the mold box as before. The bars 45 and their supported cores are then swung downwardly to the point where the sleeves 53 engage the pins 52 and the cores lowered into the mold box until the bars rest upon the surface of the table. The operation of filling, vibrating and removal is then repeated in a continuous manner, requiring approximately one minute for the complete operation.

It will be apparent from the foregoing, that a very novel and highly efficient machine has been provided which will quickly and effectively form tile or block in a rapid and convenient manner. The parts are relatively simple, require a minimum of attention and are capable of forming the special type block of this application in a relatively rapid manner with a minimum of effort.

While the elevating of the pallet support and the elevating of the core frame has been shown as controlled by the levers 36 and 64, it will be apparent that these levers may be suitably controlled by hydraulic or air pistons, operable from a suitable control panel. It is further contemplated, that machines of this character shall be arranged in end to end relation, with the hopper 21 shiftable from an intermediate position to serve both machines in a rapid and expeditious manner.

It is to be understood, that while a preferred form of the device has been illustrated, various mechanical changes may be resorted to as fall within the spirit of the invention or the scope of the subjoined claims.

Having described my invention, what I claim as new and desire to secure by Letters Patent is:

1. A machine for molding hollow blocks that embodies a base, a mold box formed in the base that is open at top and bottom, a pallet that is supported in the mold box, means to shift the pallet in a vertical plane to be disposed above the machine, a core device supported within the mold box in spaced cooperative relation to the pallet, means for shifting the core device in a vertical plane, the core device being hinged to swing away from the mold box after being shifted vertically, vibrator means for vibrating the article to be molded and a hopper movable into and out of registry with the mold box.

2. A machine for molding hollow cement blocks that embodies a rigid base, cover plates supported on the base, a mold box formed in the base, one cover plate provided with an opening co-extensive with the mold box, the mold box open at its lower end, a pallet supporting frame that projects into the lower open end of the mold box, a pallet supported upon the pallet frame, the pallet being co-extensive with the mold box, means for vertically shifting the pallet frame to project the pallet and a molded cement block above the machine, core device adapted to be projected into the upper end of the mold box to be positioned in spaced relation to the pallet, a frame device for the support of the core device, vibrator means carried by the frame for the core device, means for vertically shifting the core supporting frame, the core device being hingedly connected to the core supporting frame to be swung out of alignment with the mold box after it has been vertically shifted, a hopper that traverses the plates to and from registry with the mold box and guide means for the hopper.

3. A machine for molding hollow cement blocks that consists of a base rectangular in shape and having cover plates that form a work table, a mold box formed in the base that is open at its lower end, one of the cover plates provided with an opening co-extensive with the mold box, a pallet shiftably positioned in the mold box adjacent its lower open end, a frame for the resting support of the pallet, the frame being vertically shiftable through the mold box to position the pallet above the cover plates, guide means for the frame, locking means for retaining the frame in elevated position, a pair of core devices for co-operative engagement with the pallet, spaced supporting bars for the core devices, a core supporting frame positioned in the base that has hinged connection with the bars, means carried by the base for guiding and supporting the core frame for shifting movement in a vertical plane to elevate the core devices above the pallet, a vibrator carried by the core supporting frame, the bars and their supported cores adapted to be swung out of alignment with the mold box after being elevated, trackways fixed upon the table in alignment with the bars, a material hopper positioned on the table and shiftable over the trackways and the bars for registry with the opening of the mold box and stops for limiting the shifting movement of the hopper to and from registry with the mold box.

4. A machine for molding hollow cement blocks that includes an elevated base having cover plates forming a horizontal table, a mold box formed in the base that is open at top and bottom, one of the cover plates being provided with an opening co-extensive with the mold box, a pallet to be positioned in the mold box adjacent its lower end, the pallet being co-extensive longitudinally and transversely with the mold box, a pallet supporting frame arranged in the base and shiftable vertically through the mold box, guide means for the vertical shifting movement of the pallet frame, cam devices for shifting the pallet frame vertically, core devices for shifting movement into the mold box from the upper end for resting engagement and spaced relation with respect to the pallet, parallel bars for the rigid support of the cores, the bars resting upon the table and overlying the mold box, a core supporting frame positioned in the base, the bars at one end being hinged to the last named frame, the bars at their opposite ends being detachably supported on the core supporting frame, the core supporting frame being vertically shiftable to elevate the cores above the molded cement block, guide means for the vertical shifting of the core supporting frame, a vibrator supported upon the core supporting frame and shiftable therewith, the bars and their supported cores adapted to be swung out of alignment with the mold box after being elevated, trackways on the table in normal alignment with the bars, a material hopper slidable on the trackways to and from registry with the mold box and stops to limit the sliding movement of the hopper in either direction.

5. A machine for molding hollow cement blocks that includes an elevated rectangular base having a table top, the base having a rectangular mold box formed therein at it upper end, the mold box open at top and bottom and the table top provided with an opening co-extensive with the mold box, a contoured pallet co-extensive with the length and width of the mold box for positioning in the mold box, the opposite ends of the pallet terminating flush with the open upper end of the mold box, a pallet supporting frame mounted in the base and shiftable in a vertical plane through the mold box to elevate the pallet and a supported molded block to a position above the table, guide channels formed in the base, guide rollers carried by the frame and operable in the channels, cam devices upon opposite sides of the machine that engage the frame for elevating traverse of the channels, crank means for controlling the cams, lock means formed on the cams to retain the frame in elevated position, hollow core members for positioning in the mold box in spaced co-operative relation to the pallet, a pair of spaced parallel bars overlying the table and the mold box for rigid connection with a positioning of the core members, a core supporting frame arranged in the base, the bars at one end having hinged connection with the last named frame and at their opposite ends having detachable resting engagement with the last named frame, the hinged connections adapted to traverse opening formed in the table, a resting and guiding support for the core frame carried by the base, crank means for shifting the core frame in a vertical plane to elevate the core members to a position of disengagement with a molded block, the bars and their supported core members adapted to be swung out of alignment with the mold box after elevation, an eccentric vibrator fixed upon the core frame, a motor carried by the base for driving the vibrator, trackways fixed upon the table in horizontal alignment with the bars and a hopper slidable upon the table and guided by the bars and trackways to and from registry with the mold box.

6. The structure as recited in claim 5, wherein the vertical shifting movement of the core supporting frame will interrupt the driving connection to the vibrator from the motor.

7. The structure as recited in claim 5, wherein the resting and guiding support for the core supporting frame embodies a cross shaft fixed in the base, a sleeve positioned on the shaft, a pair of vertically arranged parallel rods carried by the sleeve, tubular sleeves fixed upon the core supporting frame that are vertically slidable on the rods, link means pivotally connected with the lower end of the core frame and cranks connected with the link means that are operable by a hand crank outwardly of the machine.

8. The structure as recited in claim 4, wherein the core supporting frame consists of a pair of identical spaced apart Y-shaped frame members rigidly braced in parallel relation, a corresponding leg of each Y-shaped frame at its upper end serving as the hinged connection for the bars, the corresponding legs of the opposite side of the Y-shaped frame provided with upstanding pins at their terminal ends, the ends of the bars opposite from the hinges being provided with tubular sleeves engageable over the pins, the sleeve and pin engagement and the hinge connections bodily stripping the cores from the molded block in a vertical direction.

9. The structure as recited in claim 5, wherein the pallet supporting frame is formed of U-shape having a cross-head, a pair of parallel angle irons fixed upon the cross-head for the resting support of the pallet, the guide rollers embodying upper and lower rollers rotatable upon stub shafts carried by each leg of the U-shaped frame for traversing the guide channels, the shafts of the lowermost rollers extended outwardly for rotatably supporting anti-friction rollers, a transverse shaft that is journalled in bearings carried by the base and projecting upon opposite sides of the machine, the legs of the U-shaped frames resting upon the shaft in the lowermost position, said cams being splined upon the extended ends of the last named shaft for camming engagement with the anti-friction rollers, the outer ends of the cams being notched for locking engagement with the anti-friction rollers at the maximum of their travel upwardly, a crank arm rigidly connected with the cross-shaft at one side of the machine, the cylindrical surfaces of the guide rollers being grooved.

JOHN H. MINTON.

No references cited.